United States Patent
Studerus (10) Patent No.: US 11,326,675 B2
(45) Date of Patent: May 10, 2022

(54) METHOD FOR CONTROLLING THE ROTARY DRIVE OF A HOT FORMING MACHINE

(71) Applicant: SCHOTT Schweiz AG, St. Gallen (CH)

(72) Inventor: Diego Studerus, Steinach (CH)

(73) Assignee: SCHOTT Schweiz AG, St. Gallen (CH)

( * ) Notice: Subject to any disclaimer, the term of this patent is extended or adjusted under 35 U.S.C. 154(b) by 323 days.

(21) Appl. No.: 16/445,630

(22) Filed: Jun. 19, 2019

(65) Prior Publication Data
US 2019/0382299 A1 Dec. 19, 2019

(30) Foreign Application Priority Data

Jun. 19, 2018 (DE) .................... 10 2018 114 724.4

(51) Int. Cl.
*C03B 23/045* (2006.01)
*F16H 27/04* (2006.01)
*C03B 23/11* (2006.01)
*C03B 23/043* (2006.01)

(52) U.S. Cl.
CPC ........... *F16H 27/04* (2013.01); *C03B 23/043* (2013.01); *C03B 23/112* (2013.01); *C03B 23/045* (2013.01)

(58) Field of Classification Search
CPC ... C03B 23/112; C03B 23/114; C03B 23/116; C03B 23/118
See application file for complete search history.

(56) References Cited

U.S. PATENT DOCUMENTS

| | | | | |
|---|---|---|---|---|
| 2,125,017 A | * | 7/1938 | Halversen | C03B 23/114 65/174 |
| 4,615,719 A | * | 10/1986 | Pauluk | G07C 3/00 198/341.05 |
| 2014/0373574 A1 | * | 12/2014 | Moseler | C03B 9/3841 65/111 |
| 2020/0354252 A1 | * | 11/2020 | Tremp | C03B 23/112 |

FOREIGN PATENT DOCUMENTS

| | | | |
|---|---|---|---|
| DE | 1 011 592 | 7/1957 | |
| DE | 10 2012 006 659 A1 | 10/2013 | |
| GB | 773168 A * | 4/1957 | ........... C03B 23/112 |

OTHER PUBLICATIONS

German Office Action dated Jan. 25, 2019 for German Application No. 10 2018 114 724.4 (9 pages).

* cited by examiner

*Primary Examiner* — Jason L Lazorcik
(74) *Attorney, Agent, or Firm* — Taylor IP, P.C.

(57) ABSTRACT

A method for controlling a rotary drive of a hot forming machine having a plurality of processing stations arranged in a circular manner and a rotary table arranged thereabove, in which glass tubes to be processed are held and moved from one processing station to the next by a stepwise rotary movement, is provided. The rotary table is driven by a step gear by which a movement of a drive shaft is translated into a cyclic step movement, a step cycle of which comprises a movement phase and a subsequent standstill phase. A first value for the angular velocity of the drive shaft is assumed at a first time in the movement phase of the step cycle and a second value different from the first value is assumed at a second time in the standstill phase of the same step cycle.

13 Claims, 8 Drawing Sheets

METHOD FOR CONTROLLING THE ROTARY DRIVE OF A HOT FORMING MACHINE

BACKGROUND OF THE INVENTION

1. Field of the Invention

A method for controlling the rotary drive of a hot forming machine having a plurality of processing stations arranged in a circular manner and a rotary table arranged thereabove, in which glass tubes to be processed are held and moved from one processing station to the next.

2. Description of the Related Art

Hot forming machines are known to the skilled artist from DE 1 011 592 B, for example, and are used for the automated processing of glass in several, usually circularly arranged processing stations. They are often used for the production of pharmaceutical containers such as vials, cartridges or syringes and usually have a preloading rim on their upper side, into which a glass tube of approx. 1.5 m length is inserted in a preloading position. The glass tube then falls down at a defined point, e.g. by pushing from the preloading position via a corresponding opening through a retaining chuck, and is then fixed by the clamping jaws of the retaining chuck so that the glass tube protrudes a certain length downwards beyond the retaining chuck. At the open end projecting downwards, the glass tube is subjected to certain processing operations which are carried out at different processing stations. For this purpose, the machine and with it the holding chucks are rotated by a certain angle from one machining position to the next.

This is usually done at a given cycle speed by a step gear in which a continuous rotary movement of a drive shaft is converted into an intermittent rotary movement in which a standstill phase alternates with a movement phase in each step cycle. In the standstill phase, the gear output stands still between the individual movement steps until the next step begins. As a rule, an asynchronous motor in conjunction with a reduction gear is used to move the drive shaft. From DE 10 2012 006 659 A1 it is also known to use a servo motor. The step gear itself can in principle be realized in different ways, among other things by wheel gears, wheel coupling gears, coupling gears or cam gears.

Depending on the end product to be produced, glass tubes of different diameters must be transferred to the hot forming machine for processing. Especially for products with high glass tube diameters, where a larger glass mass has to be formed, a longer processing time at the respective station is necessary. Therefore, the speed or angular velocity of the drive shaft must be reduced for such larger glass diameters so that the standstill time used for machining is extended in each step cycle. However, the disadvantage is that the production frequency is reduced, i.e. fewer products can be produced per minute.

What is needed in the art is a method for controlling the rotary drive of a hot forming machine of the type mentioned above, as well as a control unit for such a rotary drive, a drive unit for such a hot forming machine, a hot forming machine and a method for retrofitting a hot forming machine, each of which enable an optimum product frequency for products with different processing times.

SUMMARY OF THE INVENTION

Exemplary embodiments disclosed herein provide a method that assumes a first value for an angular velocity of a drive shaft at a first time in a movement phase of a step cycle and a second value different from the first value at a second time in a standstill phase of the same step cycle.

Exemplary embodiments disclosed herein also provide a control unit that is adapted to drive the drive shaft of a step transmission with a variable angular velocity in such a manner that the angular velocity of the drive shaft assumes a first value at a first time in the movement phase of a step cycle and assumes a second value different from the first value at a second time in the standstill phase of the same step cycle.

The exemplary embodiments are based on the consideration that maximum efficiency of the hot forming line can be achieved with a production-related processing time, i.e. standstill time, by minimizing the ratio between transfer time, i.e. movement time and processing time. While the cycle time of the machine is solely determined by the processing time and kept as short as possible in order to be able to carry out the glass forming (glass mass movement) with high quality, the associated transfer time is actually unproductive, allowing the product to cool between two forming steps. Therefore, the transfer time, i.e. the movement phase, should be shortened to increase efficiency and product frequency.

However, this poses the problem that the relationship between transfer time and standstill time is given by the geometry of the step-shift gearbox and is therefore fixed. The design of the step-shift gearboxes is always based on the required maximum speed and is based, among other things, on the fact that no additional load is placed on its components as a result of speed changes. For example, if a machine is designed for cycle 40 (40 swivels per minute=products per minute), a cycle lasts 60/40 seconds=1.5 seconds. The swivel time would then be 0.375 seconds and the machining time 1.125 seconds, for example, with a geometry-dependent ratio of 1:3 (movement phase:standstill phase). Now, if the machine can now only be operated with cycle 20 for another product due to the process, the swivel time will be 0.75 seconds due to the fixed ratio, although the same gearbox could also be used to swivel in half the time.

In order to shorten the transfer time and the associated change in the relationship between the standstill phase and the movement phase, it would be possible to replace the gearbox when changing to another product, but this would be technically complex and therefore not sensible. Instead, it was recognized that a change in this ratio can also be easily achieved by changing the control, i.e. by changing the angular speed or speed of the drive shaft of the step gearbox during one cycle. Specifically, the angular velocity of the drive shaft should assume a first value at a first time in the motion phase of a step cycle and a second time in the standstill phase of the same step cycle, a second value different from the first value. The speed of the drive shaft is thus changed between the standstill and movement phases of a cycle.

In some embodiments, the first value for angular velocity reached in the movement phase is higher than the second value reached in the standstill phase. In other words: in the movement phase, the speed is increased and thus the transfer time shortened, so that a reduced cycle time is achieved with the same machining time.

The angular velocity is constant during the movement phase. This means that the entire speed change takes place during the standstill phase, i.e. at a time when the step gear does not transmit any force. This prevents the gearbox from being stressed by angular acceleration. The speed is reduced at the beginning of the standstill phase and increased again at the end of the standstill phase.

In some embodiments, a maximum angular acceleration of the rotary table in the movement phase is determined from a mechanical load capacity, and the angular velocity during the movement phase is selected in such a way that this maximum angular acceleration is essentially achieved and/or not exceeded. In other words, the maximum mechanically justifiable swivel speed is determined on the basis of the overall system. This may be determined on the basis of the step gear, as this is the limiting factor with regard to the mechanical load capacity. In the movement phase, the drive shaft is constantly driven in such a way that the mechanically maximum possible speed for the swiveling process is essentially achieved, i.e. at least 80 or 90%, of the maximum possible speed is reached, and not exceeded in order to avoid the aforementioned damage.

In some embodiments, the angular velocity of the drive shaft is also constant during a period of time within the standstill phase. During the standstill phase, therefore, there is no continuous change in angular velocity, i.e. a deceleration to an apex and an acceleration immediately following, but the angular velocity is reduced at the beginning of the standstill phase and then kept at a constant level. It is only increased again at the end of the standstill phase. The time span of the constant angular velocity may thus be symmetrically centered in the standstill phase (and is of course shorter than the standstill phase).

The mentioned time span of constant angular velocity may include more than 60%, such as more than 80%, of the standstill phase. A particularly long period of constant angular velocity facilitates the control of the process, especially with regard to the calculation of the time ratio between standstill and movement and the control, since periods of angular velocity change are minimized.

Furthermore, a maximum angular acceleration of the drive shaft may be determined on the basis of a mechanical load capacity, and the change of the angular velocity during the standstill phase outside the time span is selected in such a way that this maximum angular acceleration is essentially reached and/or not exceeded. This mechanical maximum load capacity is given by the reduction gear, since the rotary table is not moved during the standstill phase. At the beginning of the standstill phase, the slowing down occurs at the maximum (negative) acceleration possible, i.e. 80, 90 or even more percent of the calculated maximum load acceleration (but not above), and at the end of the standstill phase acceleration occurs just as quickly.

In some embodiments of the method, a plurality of step cycles follow immediately one after the other, whereby the angular velocity curves of each step cycle are identical. In other words, the set curve of the angular velocity change is repeated identically in each step cycle.

With regard to the drive unit for a hot forming machine, having a plurality of processing stations arranged in a circular manner and a rotary table arranged thereabove, in which glass tubes to be processed are held and can be moved from one processing station to the next by a stepwise rotary movement, the rotary table being connected on the drive side to a step gear, which translates a movement of a drive shaft into a cyclic step movement, the step cycle of which comprises a movement phase and a subsequent standstill phase, comprising a drive motor adapted to drive the drive shaft at a variable, predeterminable angular velocity, the task is solved by the drive unit further comprising a control unit described above.

In such a drive unit, the drive motor may be designed as a synchronous motor. In contrast to the asynchronous motors used up to now, the targeted influencing of the angular velocity of the drive shaft described above is particularly easy with a synchronous motor, since the speed of the synchronous motor is rigidly coupled to the operating frequency compared to the asynchronous motor. Using an inverter with appropriate control, the described variation of the angular velocity is particularly easy to control and implement.

Furthermore, in such a drive unit the step gear may be designed as a cylinder cam gear. Such a cylinder cam gear, also known as a globoidal rotary table gear, comprises a continuously rotating cylinder in which a groove curve is incorporated. A pickup connected to the rotary table intervenes in the groove curve so that the step movement is transmitted. The standstill time corresponds to a straight course of the groove curve on the cylinder. As described above, in this phase the speed can be changed particularly easily, as no axial force acts on the cylinder shell. A cylinder cam gear is therefore particularly suitable for the application described.

In some embodiments, a method for retrofitting a hot forming machine with a plurality of processing stations arranged in a circular manner and a rotary table arranged thereabove is provided, in which glass tubes to be processed are held and moved from one processing station to the next by a stepwise rotary movement, wherein the rotary table is connected on the drive side to a step gear which translates a movement of a drive shaft into a cyclic step movement, the step cycle of which comprises a movement phase and a subsequent standstill phase. A control unit described above is retrofitted in the hot forming machine. If the hot forming machine is equipped with a suitable drive motor, the advantages described above can be achieved by replacing the control system and implementing the process described above.

In some embodiments of the method, however, a drive motor for driving the drive shaft with a variable, pre-settable angular speed is retrofitted in the hot forming machine. Such a drive motor may be designed as a synchronous motor as described above.

The described advantages may be achieved in part by the fact that increasing the drive speed of the step gear in the movement phase of the rotary table of a hot forming machine, possibly in conjunction with the installation of a suitable drive motor, can achieve a shortening of the cycle time and thus an increase in efficiency without the machining time having to be shortened.

The described method is suitable for any vertically aligned rotary transfer machines for forming glass tubes into pharmaceutical primary packaging such as syringes, cartridges, bottles and ampoules. It is suitable for both new and existing machines as a retrofit.

In practice, machines controlled by the method described show increases in performance with the same quality and the same process if one compares refitted machines with machines that have not been refitted. A modified machine was used to check all residual risks, in particular whether the higher dynamics of the swiveling of the ring had an influence on the glass tubes that were swiveled along with it, which is not the case. It has been shown that the shorter transfer time from station to station for some products leads to a reduction in the cooling of the heated product. This fact requires slight adjustments to the burner output, which is, however, part of the necessary adjustment work when changing the product on the machine.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
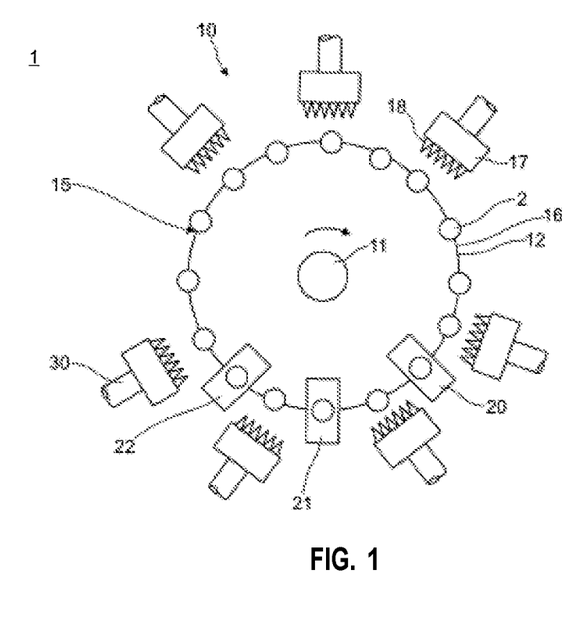
FIG. 1 illustrates a schematic view of parts of an exemplary embodiment of a hot forming machine.
Figure 2:
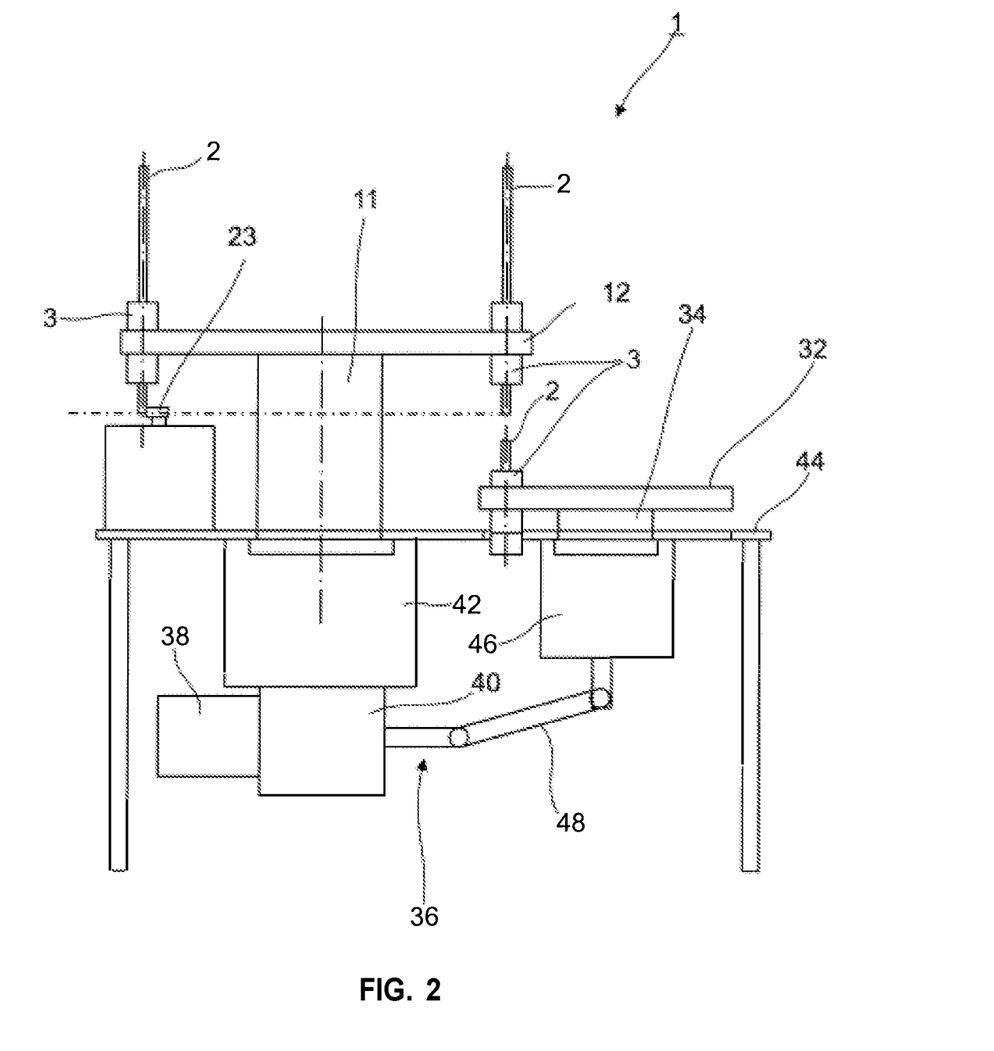
FIG. 2 illustrates a schematic side view of parts of the hot forming machine of FIG. 1.

FIGS. 1 and 2 show in a schematic view and side view the basic structure of a hot forming machine 1 used for the production of pharmaceutical primary packaging made of glass from a glass tube 2, which is fed vertically aligned from above. The glass containers to be manufactured, such as vials, cartridges or syringes, are used for the storage and/or administration of pharmaceutical active ingredients. The hot forming machine 1 comprises a so-called mother machine 10, which serves in particular for hot forming of the supplied glass tube 2 at the later bottom or an end opposite to the open end of the glass container, in particular for forming a neck with a neck opening.

Glass tubes 2 are fed at feed position 15 from a rotary table which is not shown in detail. They fall down by opening a holding device in the rotary table, are caught by a pipe catcher and are then held in holding chucks 3 at a suitable machining height, which are distributed over the circumference of a rotary table 12. The rotary table 12 is designed in the form of a rotary table with chucks 3 and is fixed to the assigned column 11 and mounted on a step gear 42, which is illustrated in more detail in FIG. 2. The rotary table 12 and the column 11 are rotated and swiveled step by step around the axis of column 11, as described in more detail below. The glass tubes 2 held on the chucks 3 are guided step by step past gas burners 17 and various processing stations 20-23, at which the processing and hot forming of the glass containers takes place during a respective standstill time.

After passing through the processing stations 20-23, the glass containers are inspected in a non-tactile manner at least in the area of the neck and neck opening with the aid of an inspection system 30 and their properties are documented. The inspection system 30 can, for example, be a video camera with image evaluation software, with which geometrical dimensions of the glass containers are evaluated on the basis of the images recorded by the video camera, for example the geometrical dimensions in the case of vials. Finally, the glass containers are transferred at position 16 to a downstream processing machine 32, which is only shown in FIG. 2. In the same way, the downstream processing machine has a column 34 with which the upper ring is firmly connected and on which the step gear 46, which is also described in more detail for FIG. 2, is rotatably mounted as described for the first machine 10.

The drive unit of both machines 10, 32 is also shown in FIG. 2. In the exemplary embodiment it comprises a drive motor 38 with a reduction gear 40 and a powerful step gear 42, on which the column 11 of the mother machine 10 is directly mounted. The reduction gear 40 and the drive motor 38 are mounted below a working plane (table top) 44. The processing stations 20-23 and heat sources for forming described above are mounted on the table top 44. The movements of the columns 11, 34 are synchronized to realize the transfer from the mother machine 10 to the downstream processing machine 32 described above. For this purpose, a second step gear 46 is provided below the column 34, which is fixed to the reduction gear 40 by a cardan shaft 48.

In the production run described above, the drive motor 38 drives the step-shift gearboxes 42, 46 via the reduction gear 40. In the prior art, this is done at a constant speed. The curve of the step gears 42, 46, which are designed as cylinder cam gears, translate the constant input speed in the prior art into a swivel from one working position of the rotary table 12 to the next, as described above. The rotary table 12 stands still between two swivels and this standstill is used for the individual steps of forming the glass tube 2.

Figure 3:
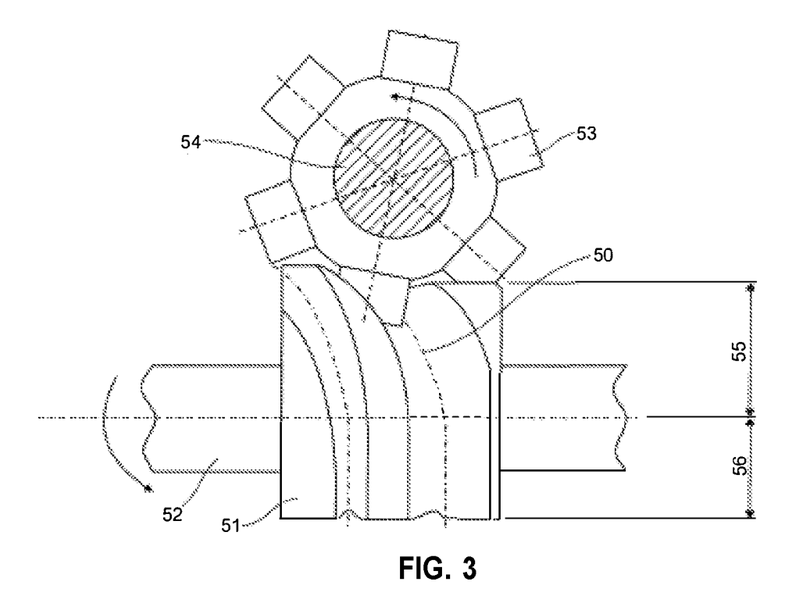
FIG. 3 schematically illustrates the construction of a cylinder cam gear.

The basic design of the step gearboxes 42, 46 is shown in FIG. 3. The cam contour 50 of the step gear 42, 46, which is designed as a cylinder cam gear, is worked into the cylindrical surface 51 of the drive shaft 52 and is transferred via cam rollers 53 to the output shaft 54, which is connected to the respective column 11, 34. One revolution of the drive shaft 52 represents one step cycle (from one working position to the next). At a constant drive speed, there is a fixed ratio between the standstill phase at the working position and the swivel movement phase, which is determined by the shape of the curve contour 50. In prior art technology, the curves of step gears for hot forming machines are designed in such a way that the swivel range 55 is between approx. 90-105° (transfer angle) and the remaining 255-270° are required for the standstill range 56 (machining angle).

In this context, the problem arises that glass tubes 2 with a larger diameter require a longer processing time, which also extends the (unproductive) swivel time.

To solve this problem, the ratio between movement phase and standstill phase is changed with the aim of producing more products per minute, as explained below. The ratio is changed by changing the speed during each step cycle in order to cause movement at a different speed through the swivel range 55 of the curve contour 50 than through the standstill range 56. This requires, on the one hand, a changed control system and, on the other hand, a synchronous motor (servo motor) instead of the asynchronous motor, as described below.

Figure 4:
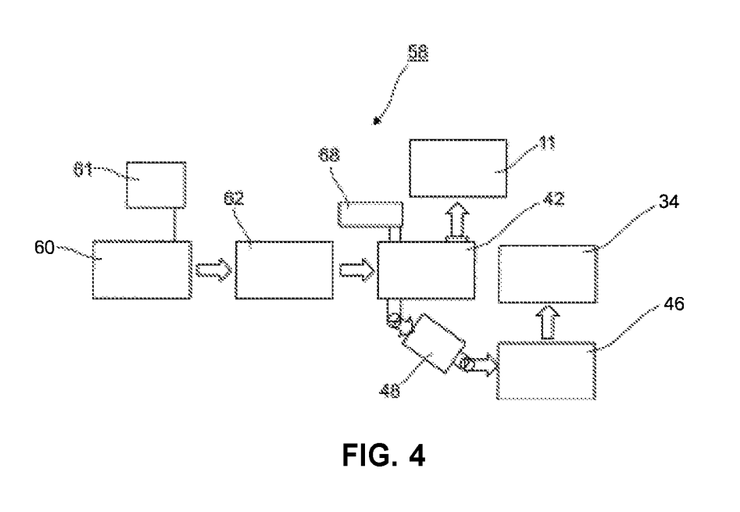
FIG. 4 illustrates a schematic sketch of a drive unit for a hot forming machine with a synchronous motor.

FIG. 4 shows the modified drive unit 58 for the columns 11, 34 of a vertically aligned hot forming machine 1 as described in FIGS. 1 and 2. This initially comprises a synchronous motor 60 instead of the previous asynchronous motor. The synchronous motor 60 is controlled by a servo-controller 61. Depending on the design of the reduction gear 40 used so far and the desired speed changes to increase performance, a more powerful reduction gear 62 may have to be used under certain circumstances (design required). The reduction gear 62 then drives the step gear 42 of the mother machine 10, which has been retained unchanged. The remaining mechanical part of the drive unit 58 is also retained as described above.

At the other end of the continuous drive shaft 52 of the step gear 42, the drive power is transferred by the cardan shaft 48 to a second step gear 46 for the downstream processing machine 32. The cardan shaft 48 allows a height adjustment of the second column 34 in order to change the product length. An encoder 68 allows position determination and a control loop to be set up with the servocontroller 61 of the synchronous motor 60. By the servocontroller 61, the speed of the synchronous motor 60 is changed within each step cycle, controlled by an unspecified control unit. In the exemplary embodiment, one step cycle corresponds to one full rotation (360°) of the input shaft 52 of the step gear 42, 46 and results in a swiveling from working position to working position of the rim on the output side of the step gearbox 42, 46.

Figure 5:
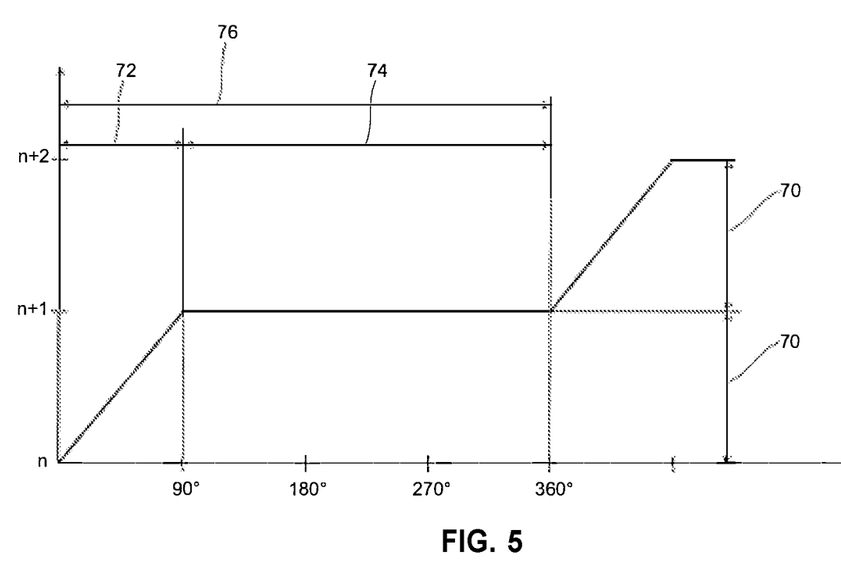
FIG. 5 illustrates a graph showing the step position of a column of the hot forming machine against the angular position of the drive shaft of the cylinder cam gear according to the prior art.

The principle relationship between the position of the respective column 11, 34 against the angular position of the drive shaft 52 is shown in the diagram according to FIG. 5, which shows the latter against the former. The abscissa axis shows the angular position of the drive shaft 52 of the step gear 42, 46, the ordinate axis shows the position of column 11, 34 in units of machining stations (n). Between 0° and 90° of the drive shaft 52 the column 11, 34 moves in such a way that the glass tube 2 is moved from position n to position n+1. This corresponds to one movement phase 72. From 90° to 360° (=0°) the standstill phase 74 continues, there is no movement at column 11, 34. Movement phase 72 and standstill phase 74 form a step cycle 76. Step cycle 76 then starts again identically from the beginning.

Figure 6:
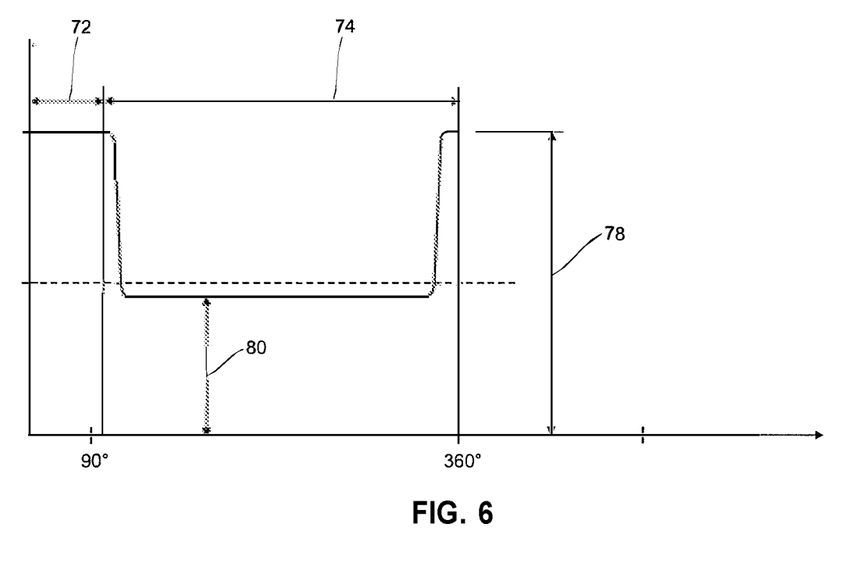
FIG. 6 illustrates a graph showing the angular velocity of the drive shaft against the angular position of the drive shaft.

Over each step cycle 76, the angular speed or speed of the drive shaft 52 is now changed by the described control as shown in FIG. 6. This shows the angular velocity of the drive shaft 52 against the angular position of the drive shaft 52. Since the speed should not be changed during the movement phase 72 in order not to overload the cam rollers 53 or not to exceed the maximum surface pressure on the cam contour 50, the speed is only changed during the standstill phase 74. The movement phase 72 is always traversed with a value 78, which is as close as possible to the mechanically maximum possible value for the angular velocity, i.e. as close as possible to 80, 90 or even more percent of this maximum possible value. The speed during the standstill phase 74 can be selected almost freely, because the curve contour 50 is not loaded, but only the reduction gear 62. In order not to have to change the process on hot forming machine 1, the same standstill time (machining time) as for the prior art will have to be maintained for an optimization of a product.

To achieve this, the cycle is repeated as follows: Immediately after the movement phase 72 with maximum speed at the first value 78, the angular velocity is reduced to a value 80, which is lower than in the prior art process with asynchronous motor. The angular velocity remains at this value 80 for a period of time that constitutes more than 80% of the standstill phase 74. Shortly before reaching the next swivel, the angular velocity is raised again to the previous value 78. Acceleration and deceleration take place with the highest possible angular acceleration, which the reduction gear 40, 62 permits as maximum load. This maximum acceleration is calculated on the basis of the permissible torque for the gearbox. Alternatively or additionally, the condition is that the time to reduce the speed plus the time at constant speed plus the time to accelerate the speed is identical overall to the time which, in the prior art, was the time at constant speed in the standstill phase 74. For use with conventional clock rates, the optimization results in a yield increase potential of up to 20%, depending on the product.

Figure 7:
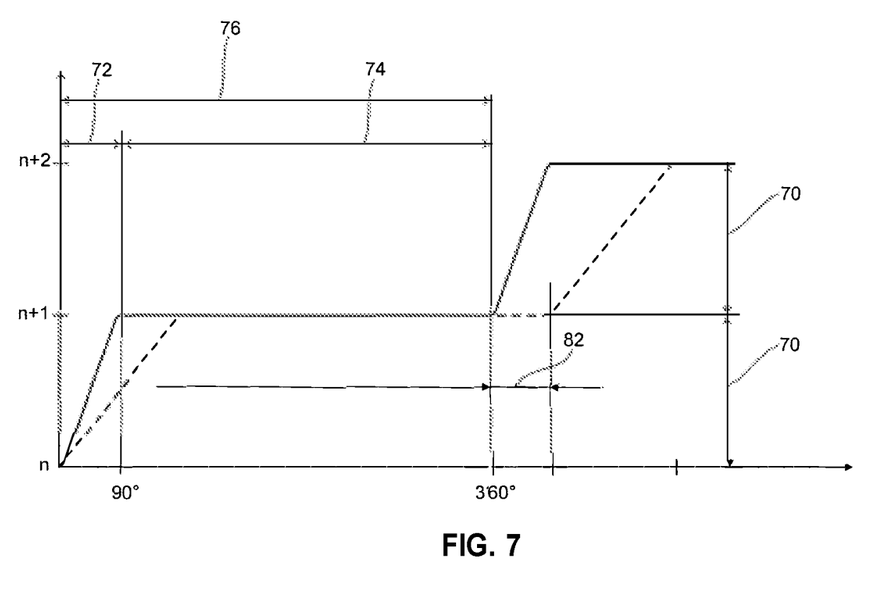
FIG. 7 illustrates a graph showing the step position of a column of the hot forming machine against the angular position of the drive shaft of the cylinder cam gear with variable angular speed.
Figure 8:
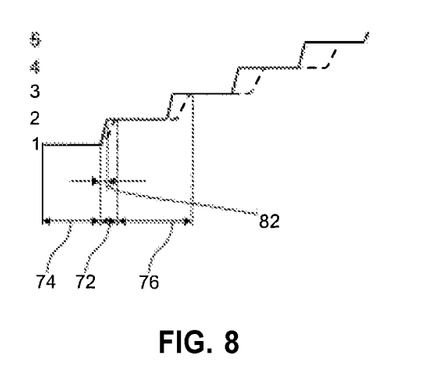
FIG. 8 illustrates a graph showing the step position of a column of the hot forming machine against the angular position of the drive shaft of the cylinder cam gear with variable angular speed over several step cycles.

The described change of the angular speed of the drive shaft 52 of the step gearbox 42, 46 results in a changed swivel movement of the column 11, 34, which is shown in FIG. 7. FIG. 7 is a graphic which shows identical quantities as in FIG. 5 against each other. The curve from FIG. 5 is shown dashed. The continuous curve now shows the change with variable angular speed according to FIG. 6: with the same standstill phase 74 and shortened movement phase 72 for swiveling from one position to the next 70, the duration of the step cycle is shortened by an amount 82. The invention makes it possible to swivel at any selected time for the standstill phase 74 (cycle rate) with the minimum or a selectable movement phase 72. Thus the ratio between movement phase 72 and standstill phase 74 becomes variable and is no longer fixed as with the prior art.

The shortened transfer time means that more swivels can be made from position to position per time unit as with the prior art. The concept described here shows a good motion characteristic and no disadvantages for the product when tested on a converted machine up to cycle 44 (44 swivels per minute=products per minute). The reduced swivel time leads to a higher number of end products per minute. For example, in prior art technology with a machine cycle of 20 products per minute, the invention with the same processing time can result in 23.2 pieces per minute, which corresponds to a production increase of 16%. With faster clock rates, the effect becomes smaller; for example, an improvement to 40.8 can be achieved with clock 40, but this still corresponds to an increase of 2%.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

REFERENCE SIGN LIST

1 Hot forming machine
2 Glass tube or semi-finished intermediate product
3 Holding chuck
10 Mother machine
11 Pillar
12 Rotary table
15 Feed section
16 Transfer section
17 Gas burner 18 Burner flame
20, 21, 22 Processing station
23 Processing station
30 Non-tactile inspection system, e.g. video camera
32 Machine
34 Pillar
36 Drive unit
38 Drive motor
40 Ratio reducer
42 Step gear
44 Working level
46 Step gear
48 Cardan shaft
50 Curve contour
51 Surface area
52 Drive shaft
53 Curve roller
54 Output shaft
55 Swivel range
56 Standstill range
58 Drive unit
60 Synchronous motor
61 Servo controller
62 Speed reducer
68 Encoder
70 Movement by one position n
72 Movement phase
74 Standstill phase
76 Step cycle
78, 80 Value for angular velocity
82 Amount of time reduction

What is claimed is:

1. A hot forming machine, comprising:
a plurality of processing stations arranged in a circular manner and a rotary table arranged thereabove, in which glass tubes to be processed are held and movable from one processing station to the next by a stepwise rotary movement, the rotary table being connected on a drive side to a step gear which translates a movement of a drive shaft into a cyclic step movement, a step cycle of which comprises a movement phase and a subsequent standstill phase; and
a drive unit comprising:
a drive motor adapted to drive the drive shaft at a variable, predeterminable angular velocity; and
a control unit adapted to drive the drive shaft in such a manner that the angular velocity of the drive shaft assumes a first value at a first time in the movement phase of the step cycle and assumes a second value different from the first value at a second time in the standstill phase of the same step cycle.

2. The hot forming machine according to claim 1, wherein the first value is higher than the second value.

3. The hot forming machine according to claim 1, wherein the angular velocity is constant during the movement phase.

4. The hot forming machine according to claim 1, wherein the angular velocity is constant during a time span within the standstill phase.

5. The hot forming machine according to claim 4, wherein the time span comprises more than 60% of the standstill phase.

6. The hot forming machine according to claim 1, wherein a plurality of step cycles immediately follow one another, an angular velocity curve of each step cycle being identical.

7. A drive unit for a hot forming machine having a plurality of processing stations arranged in a circular manner and a rotary table arranged thereabove, in which glass tubes to be processed are held and movable from one processing station to the next by a stepwise rotary movement, the rotary table being connected on a drive side to a step gear which translates a movement of a drive shaft into a cyclic step movement, a step cycle of which comprises a movement phase and a subsequent standstill phase, the drive unit comprising:
a drive motor adapted to drive the drive shaft at a variable, predeterminable angular velocity; and
a control unit adapted to drive the drive shaft in such a manner that the angular velocity of the drive shaft assumes a first value at a first time in the movement phase of the step cycle and assumes a second value different from the first value at a second time in the standstill phase of the same step cycle.

8. The drive unit according to claim 7, wherein the drive motor is designed as a synchronous motor.

9. The drive unit according to claim 7, wherein the step gear is designed as a cylinder cam gear.

10. A control unit for a rotary drive of a hot forming machine having a plurality of processing stations arranged in a circular manner and a rotary table arranged thereabove, in which glass tubes to be processed are held and movable from one processing station to the next by a stepwise rotary movement, the rotary table being connected on a drive side to a step gear which translates a movement of a drive shaft into a cyclic step movement, a step cycle of which comprises a movement phase and a subsequent standstill phase, the control unit being adapted to drive the drive shaft of the step gear with a variable angular velocity in such a manner that the angular velocity of the drive shaft assumes a first value at a first time in the movement phase of the step cycle and assumes a second value different from the first value at a second time in the standstill phase of the same step cycle.

11. A method for retrofitting a hot-forming machine with a plurality of processing stations arranged in a circular manner and a rotary table arranged thereabove, in which glass tubes to be processed are held and movable from one processing station to the next by a stepwise rotary movement, the rotary table being connected on a drive side to a step gear which translates a movement of a drive shaft into a cyclic step movement, a step cycle of which comprises a movement phase and a subsequent standstill phase, the method comprising:
retrofitting a control unit in the hot forming machine, the control unit being adapted to drive the drive shaft in such a manner that the angular velocity of the drive shaft assumes a first value at a first time in the movement phase of the step cycle and assumes a second value different from the first value at a second time in the standstill phase of the same step cycle.

12. The method according to claim 11, further comprising retrofitting a drive motor for driving the drive shaft with a variable, predeterminable angular speed in the hot forming machine.

13. The method according to claim 12, wherein the drive motor is designed as a synchronous motor.

* * * * *